United States Patent
Wu

(10) Patent No.: US 6,345,836 B1
(45) Date of Patent: Feb. 12, 2002

(54) FOLDING COLLAPSIBLE GOLF CART

(76) Inventor: David Wu, No. 35-1, Jih-Hsin Street, Tu Cheng City, Taipei, Hsien (TW)

( * ) Notice: Subject to any disclaimer, the term of this patent is extended or adjusted under 35 U.S.C. 154(b) by 0 days.

(21) Appl. No.: 09/653,709

(22) Filed: Sep. 1, 2000

(51) Int. Cl.⁷ .............................. B62B 1/00
(52) U.S. Cl. .............. 280/651; 280/47.26; 280/47.315; 280/DIG. 6
(58) Field of Search ................. 280/651, 655, 280/655.1, 47.26, 646, DIG. 6, 47.24, 47.17, 47.315; 16/411, 900, 110 R; 403/97, 103

(56) References Cited

U.S. PATENT DOCUMENTS

| | | | | |
|---|---|---|---|---|
| 3,907,056 A | * | 9/1975 | Thomas, III | 180/19.1 |
| 4,522,299 A | * | 6/1985 | Clark et al. | 206/315.3 |
| 5,106,117 A | * | 4/1992 | Wang | 280/646 |
| RE33,939 E | * | 5/1992 | Cheng | 280/646 |
| 5,154,435 A | * | 10/1992 | Chiu | 280/47.315 |
| 5,451,072 A | * | 9/1995 | Weng | 280/646 |
| 5,765,857 A | * | 6/1998 | Hsiao | 280/646 |
| 6,152,463 A | * | 11/2000 | Wu | 280/47.17 |
| 6,152,465 A | * | 11/2000 | Shieh | 280/62 |

* cited by examiner

*Primary Examiner*—Brian L. Johnson
*Assistant Examiner*—Gerald Klebe
(74) *Attorney, Agent, or Firm*—Varndell & Varndell, PLLC

(57) ABSTRACT

A folding collapsible golf cart includes a front main shaft holding an upper golf bag cradle, a handle pivoted to a front end of the front main shaft and locked in one of a series of angles between the collapsed position and the extended working position, a rear main shaft pivoted to a rear of the front main shaft and locked between the collapsed position and the extended working position and holding a lower golf bag cradle and a wheel bracket, two wheel holder frames bilaterally pivoted to the wheel bracket and holding a respective wheel, and two links bilaterally coupled between the wheel holder frames and a mounting frame at the rear end of the front main shaft. The handle has curved portions, which prevent the handle from touching the heads of the golf clubs kept in the golf bag carried on the upper golf bag cradle and the lower golf bag cradle.

2 Claims, 23 Drawing Sheets

FOLDING COLLAPSIBLE GOLF CART

BACKGROUND AND SUMMARY OF THE INVENTION

The present invention relates to golf carts, and more particularly to a folding collapsible golf cart, which comprises a folding collapsible main shaft unit, and a folding collapsible handle pivoted to the main shaft unit.

Various golf carts are known folding collapsible. FIGS. from 1 through 4 show a folding collapsible golf cart according to U.S. Pat. No. RE33,939. This structure of folding collapsible golf cart comprises a front main shaft 8 and a rear main shaft 9 pivoted together and turned between the extended position and the collapsed position, retractable handle 7 coupled to the front main shaft 8, an upper golf bag cradle 81 and a lower golf bag cradle 91 respectively mounted on the shaft body 82 of the front main shaft 8 and the shaft body 92 of the rear main shaft 9 and adapted to hold a golf bag 80. The retractable handle 7 has a rod member 71 inserted into the front main shaft 8, and releasably locked by a tightening up screw 70. This structure of folding collapsible golf cart is still not satisfactory in function. The drawbacks of this structure of folding collapsible golf cart are numerous and outlined hereinafter.

1. Because the handle 7 bears much pressure when moving golf cart on the ground, the tightening up screw 70 wears quickly with use.
2. The retractable handle 7 can only be moved axially relative to the front main shaft 8, its angular position is not adjustable.
3. Because the shaft body 92 of the rear main shaft 9, the shaft body 82 of the front main shaft 8 and the rod member 71 of the retractable handle 7 are aligned in a line, the heads 901 of the storage golf clubs 90 may touch the rod member 71 when moving the golf cart on the ground, causing a damage to the heads of the golf clubs, and simultaneously producing noises.

The present invention provides a folding collapsible golf cart, which eliminates the aforesaid drawbacks. According to one aspect of the present invention, the folding collapsible golf cart comprises a front main shaft holding an upper golf bag cradle, a handle pivoted to a front end of the front main shaft and locked in one of a series of angles between the collapsed position and the extended working position, a rear main shaft pivoted to a rear of the front main shaft and locked between the collapsed position and the extended working position and holding a lower golf bag cradle and a wheel bracket, two wheel holder frames bilaterally pivoted to the wheel bracket and holding a respective wheel, and two links bilaterally coupled between the wheel holder frames and a mounting frame at the rear end of the front main shaft. The handle has curved portions, which prevent the handle from touching the heads of the golf clubs kept in the golf bag carried on the upper golf bag cradle and the lower golf bag cradle. According to another aspect of the present invention, the handle comprises two parallel rod members respectively mounted with a respective toothed engagement block, the front main shaft has its front end fixedly mounted with a toothed locating block pivotally coupled between the toothed engagement blocks at the rod members of the handle by a pivot bolt, and a locking lever is coupled to one end of the pivot bolt and turned between the locking position and the unlocking position to lock/unlock engagement between the toothed locating block and the toothed engagement blocks. According to still another aspect of the present invention, the front main shaft has a curved portion curved forwardly upwards toward the upper golf bag cradle, the rear main shaft has a curved portion curved backwardly upwards toward the lower golf bag cradle, and the rod members of the handle have a respective curved portion curved backwardly upwards, such that a big space is left between the golf bag and the handle after the mounting of the golf bag on the upper golf bag cradle and the lower golf bag cradle, preventing the rod members of the handle from touching the heads of the golf clubs kept in the golf bag.

DETAILED DESCRIPTION OF THE PREFERRED EMBODIMENT

Figure 8:
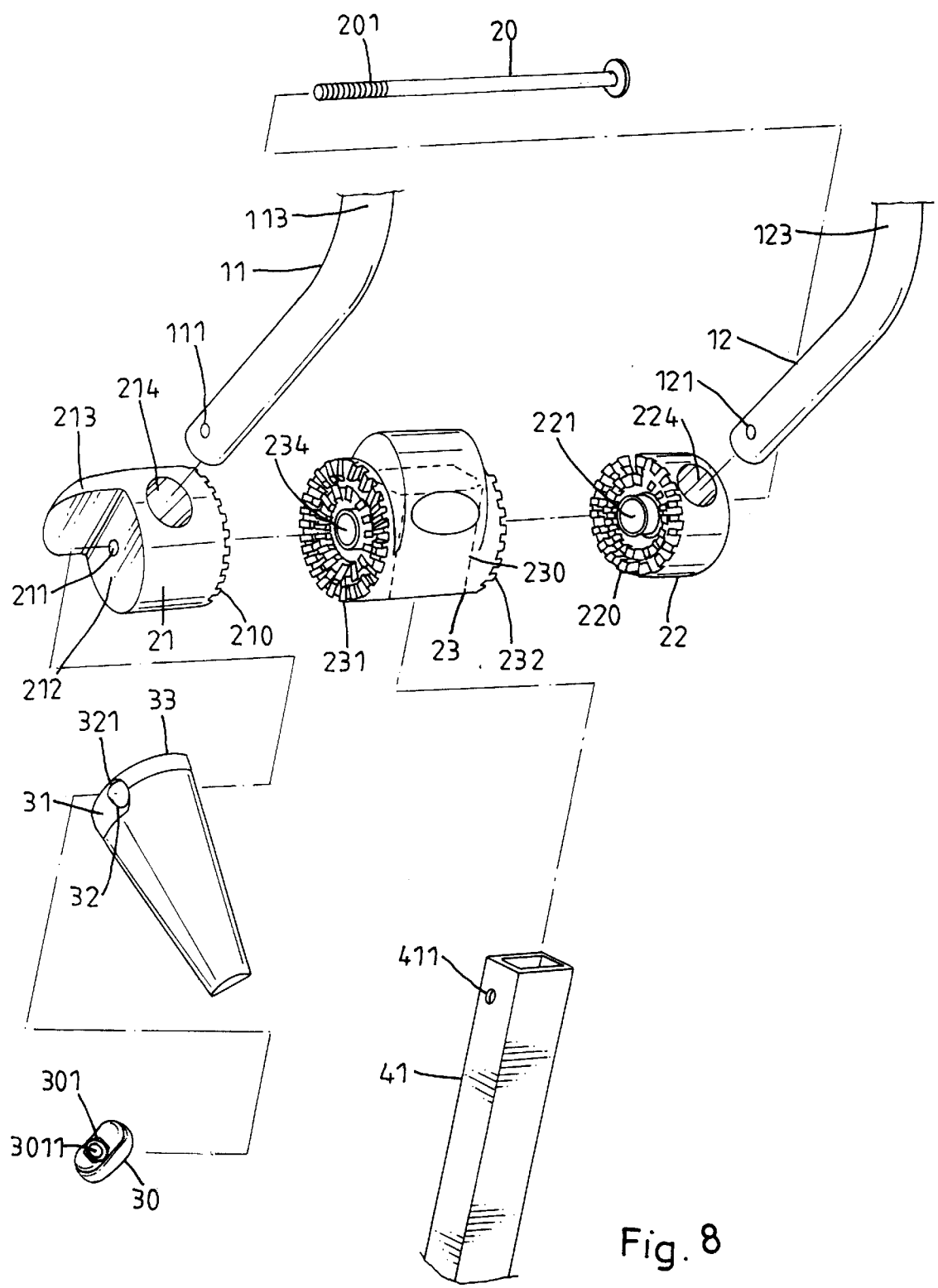
FIG. 8 is an exploded view of FIG. 7.
Figure 9:
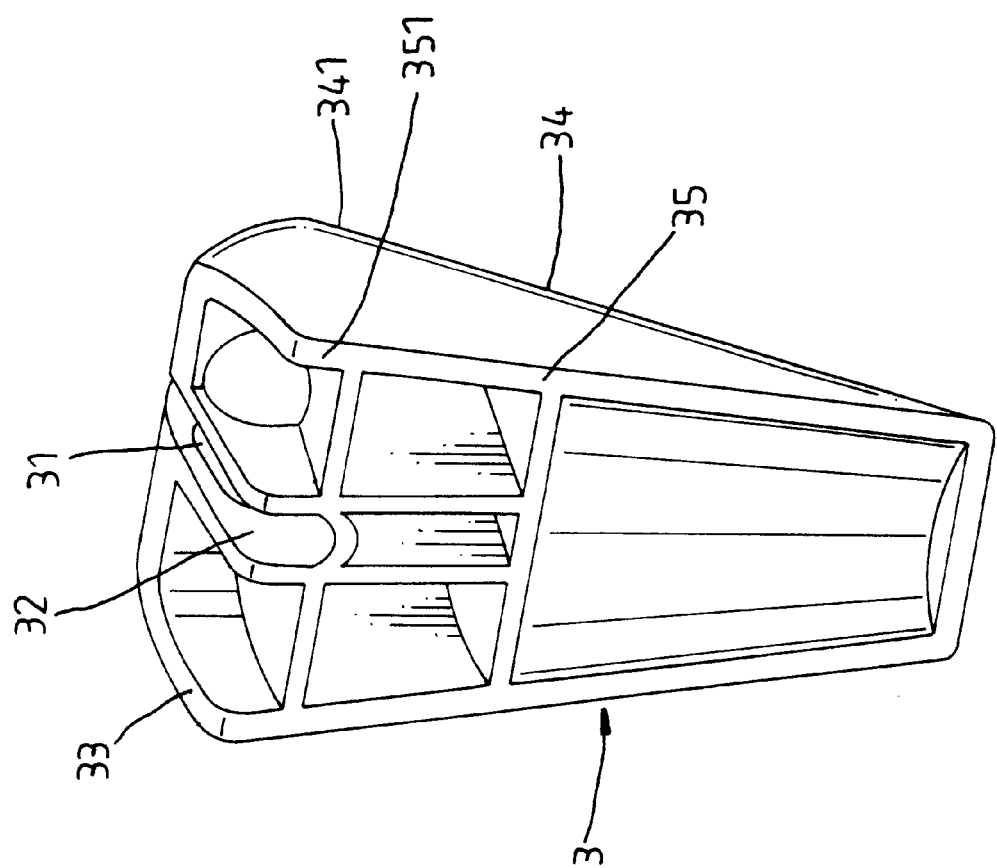
FIG. 9 is a perspective rear side view in an enlarged scale of the locking lever according to the present invention.
Figure 10:
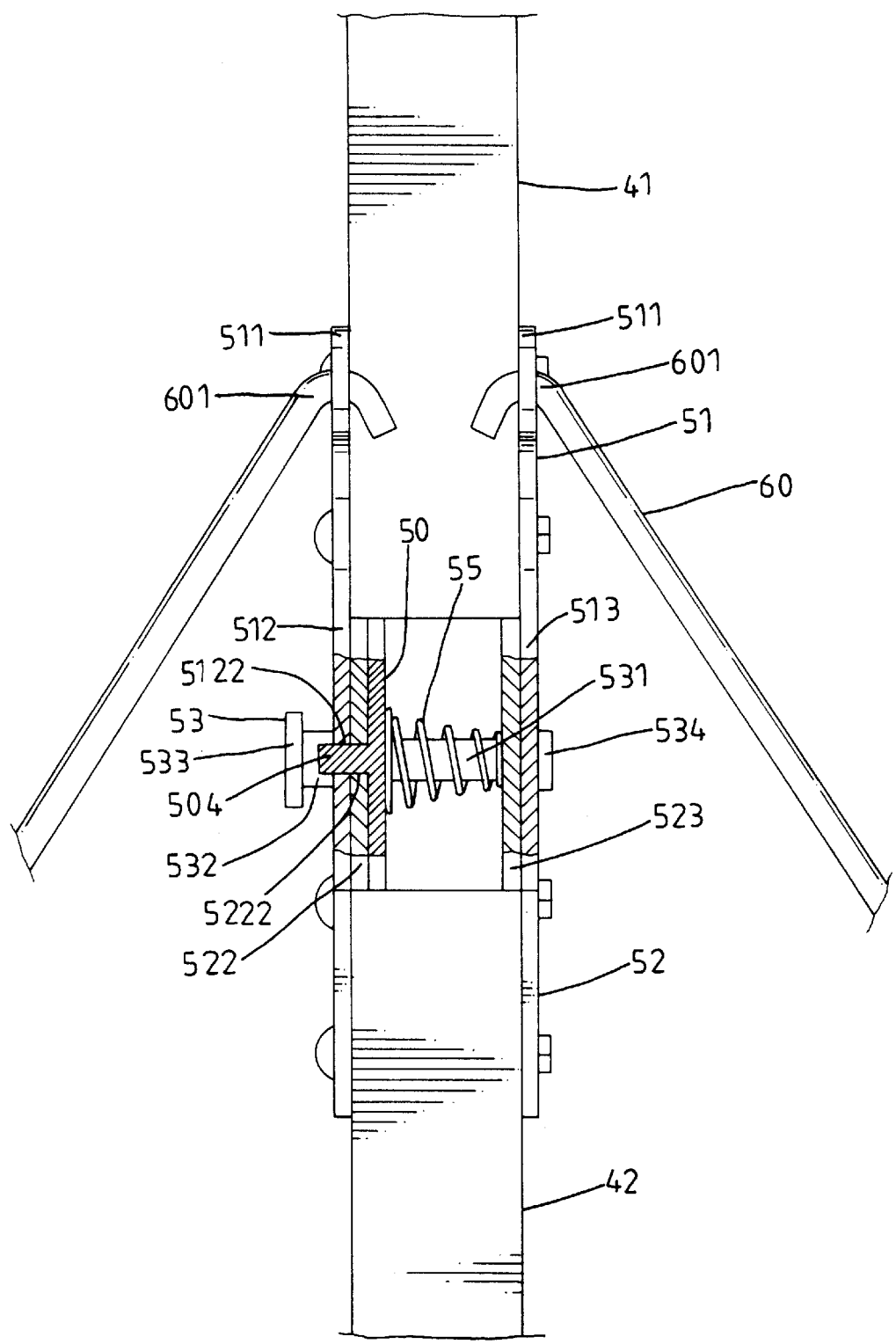
FIG. 10 is a sectional bottom view in an enlarged scale of a part of the present invention, showing the front main shaft and the rear main shaft extended out.
Figure 11:
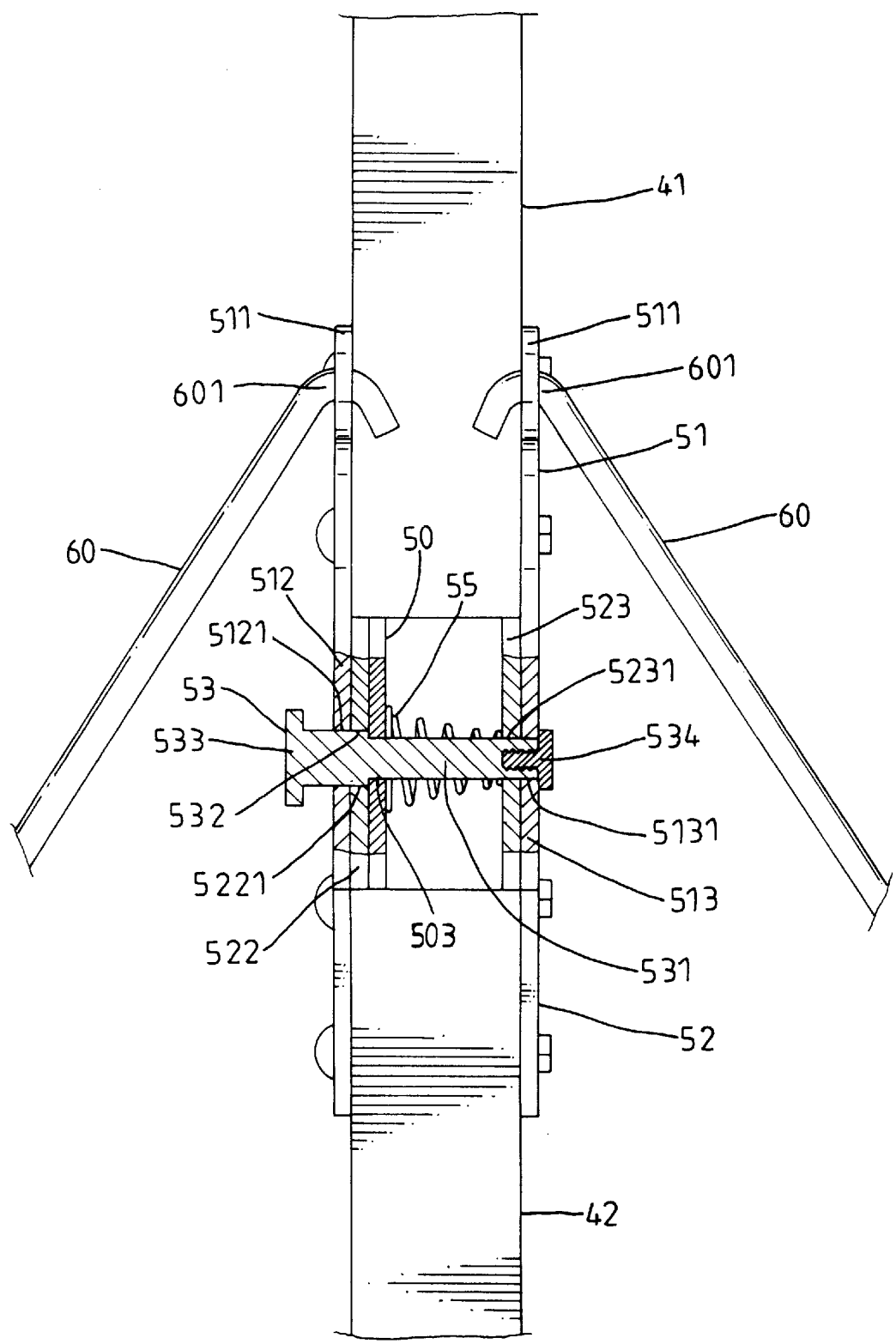
FIG. 11 is another bottom view in an enlarged scale of the present invention, showing the front main shaft and the rear main shaft extended out.

Referring to FIGS. from 5 through 25, a folding collapsible golf cart in accordance with the present invention comprises a handle 1, a front main shaft 41, a rear main shaft 42, an upper golf bag cradle 43, a wheel bracket 6, two wheel holder frames 61, and two wheels 64. The handle 1 comprises two rod members, namely, the first rod member 11 and the second rod member 12 arranged in parallel. Two engagement blocks, namely, the first engagement block 21 and the second engagement block 22 are respectively mounted on the rod members 11 and 12 of the handle 1. The rod members 11 and 12 each have a transversely extended axle hole 111 or 121 near one end. The engagement block 21 and 22 are respectively injection-molded from plastics, each comprising a toothed face 210 or 220 disposed at one side, an axle hole 211 or 221 axially extended through the center of the toothed face 210 or 220, and a transversely extended coupling hole 214 or 224, which receives the rod member 11 or 12. The first engagement block 21 further comprises a protruded portion 213 axially extended from the border area of the flat outer end 212 thereof A locating block 23 is fixedly mounted on one end, namely, the front end of the front main shaft 41, and meshed between the engagement blocks 21 and 22. The other end, namely, the rear end of the front main shaft 41 is fixedly mounted with a first mounting frame 51. The upper golf bag cradle 43 is pivotally coupled to the front main shaft 41 by a pivot 410. The locating block 23 is injection-molded from plastics, comprising two toothed faces 231 and 232 disposed at two distal ends thereof and adapted for engaging the toothed faces 210 and 220 of the engagement block 21 and 22, a radially extended mounting hole 230, which receives the front end of the front main shaft 41, and an axle hole 234 axially extended through the center of the toothed faces 210 and 220. The front main shaft 41 has an axle hole 411 transversely disposed near the front end. After insertion of the front end of the front main shaft 41 into the mounting hole 230 of the locating block 23, a pivot bolt 20 is inserted through the axle hole 121 of the second rod member 12, the axle hole 221 of the second engagement block 22, the axle hole 234 of the locating block 23, the axle hole 411 of the front main shaft 41, the axle hole 111 of the first rod member 11 and the axle hole 211 of the first engagement block 21, and then a locking lever 3 is coupled to the pivot bolt 20, and then a positioning plate 30 is fastened to the pivot bolt 20 to secure the locking lever 3 in place. The locking lever 3 is injection molded from plastics, comprising a recessed positioning portion 31, which receives the positioning plate 30, an axle groove 32 backwardly extended from the recessed positioning portion 31 for the passing of the pivot bolt 20, and a stop portion 321 disposed at one end of the axle groove 32 (see FIGS. 8 and 9). The positioning plate 30 comprises an embedded metal block 301 and a screw hole 3011 formed on the metal block 301 and threaded onto the threaded rear end 201 of the pivot bolt 20. After installation, the locking lever 3 can be turned between the locking position where the top side 33 of the locking lever 3 and the upper part 351 of the inner side 35 of the locking lever 3 are respectively stopped at the bottom side 2131 of the protruded portion 213 and the flat outer end 212 of the first engagement block 21 (see FIG. 17), and the unlocking position where the stop portion 321 of the locking lever 3 is stopped at the threaded rear end 201 of the pivot bolt 20, and gaps A and B are respectively left between the top side 33 of the locking lever 3 and the flat outer end 212 of the first engagement block 21 and between the upper part 341 of the outer side 34 of the locking lever 3 and the and bottom side 2131 of the protruded portion 213 of the first engagement block 21 (see FIG. 18), enabling the first engagement block 21 and the second engagement block 22 to be disengaged from the locating block 23, and therefore the handle 1 is allowed to be turned relative to the locating block 23 and the front main shaft 41 to the desired angle.

The rear main shaft 42 has a front end fixedly mounted with a second mounting frame 52, which is pivotally coupled to the first mounting frame 51 at the rear end of the front main shaft 41. The lower golf bag cradle 44 is pivotally coupled to one end, namely, the rear end of the rear main shaft 42 by a pivot 420. The wheel bracket 6 is fixedly mounted on the rear main shaft 42, and spaced between the second mounting frame 52 and the lower golf bag cradle 44. The wheel holder frames 61 are respectively pivoted to the wheel bracket 6 at two opposite lateral sides to hold the wheels 64, each comprising a support 611 pivoted to the wheel bracket 6, and a link 60 coupled between the support 61 and the mounting frame 51 at the front main shaft 41.

Figure 12:
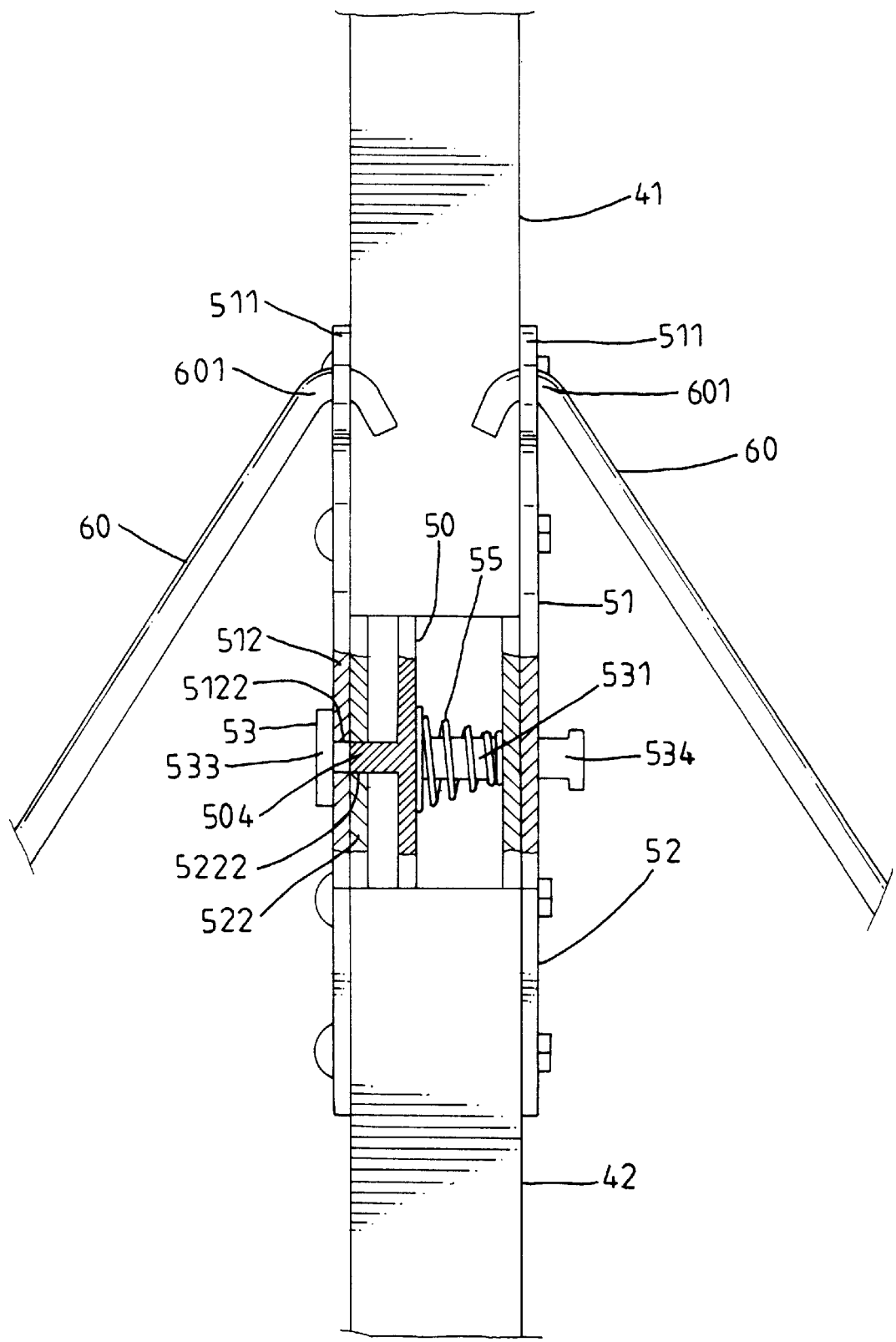
FIG. 12 is similar to FIG. 10 but showing the pivot bolt pressed, the locking plate disengaged from the first circular coupling plate of the first mounting frame and the first circular coupling plate of the second mounting frame.
Figure 13:
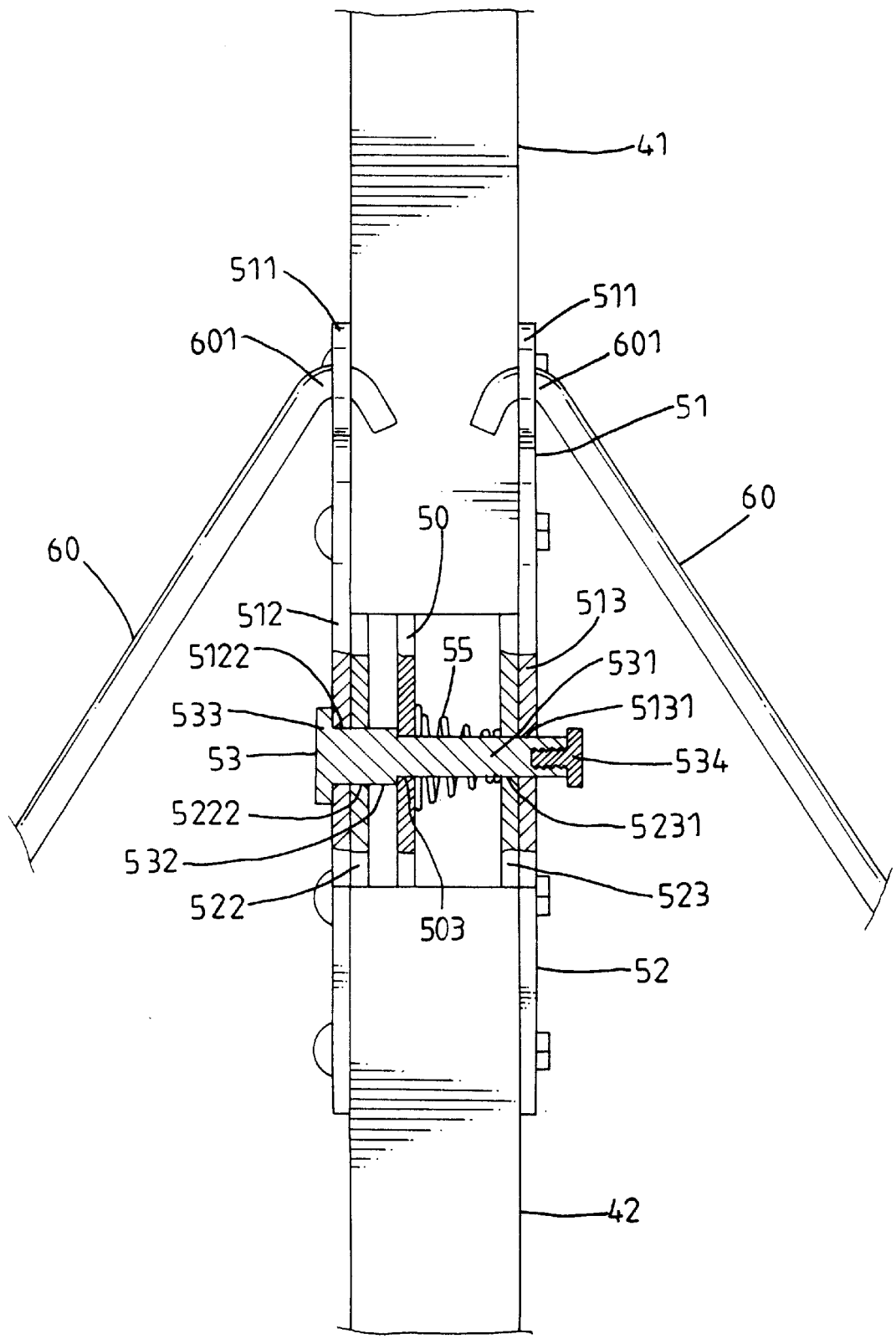
FIG. 13 is similar to FIG. 11 but showing the pivot bolt pressed, the locking plate disengaged from the first circular coupling plate of the first mounting frame and the first circular coupling plate of the second mounting frame.
Figure 14:
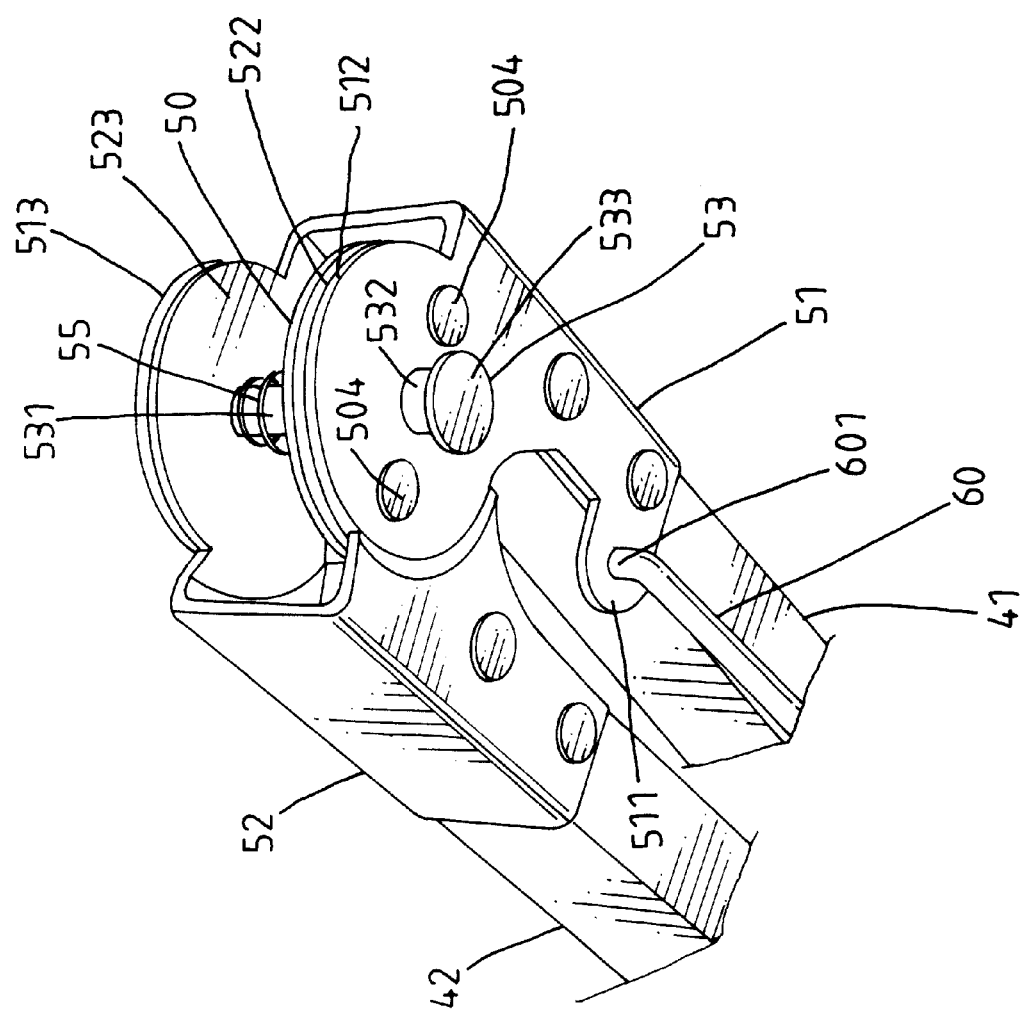
FIG. 14 is a perspective view in an enlarged scale of a part of the present invention, showing the front main shaft and the rear main shaft collapsed.
Figure 15:
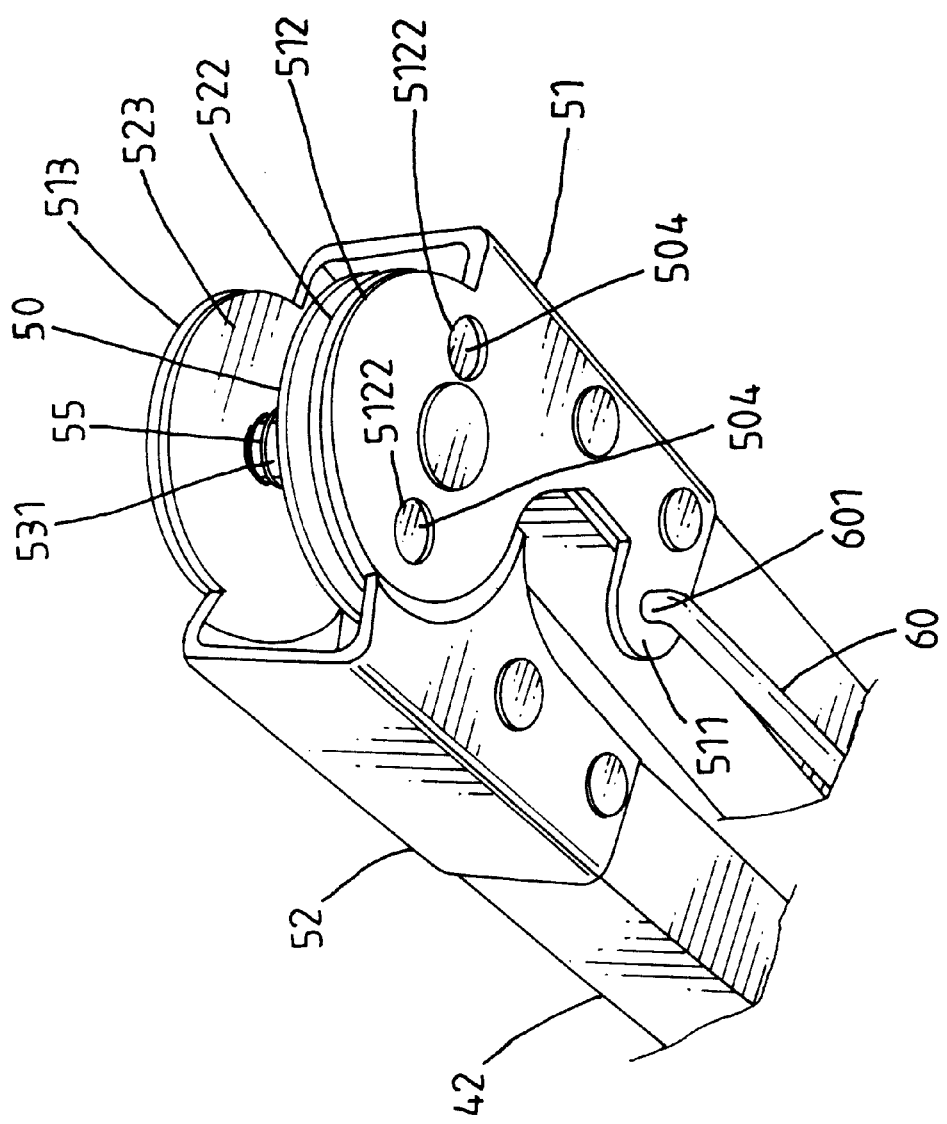
FIG. 15 is similar to FIG. 14 but showing the pivot bolt pressed.
Figure 16:
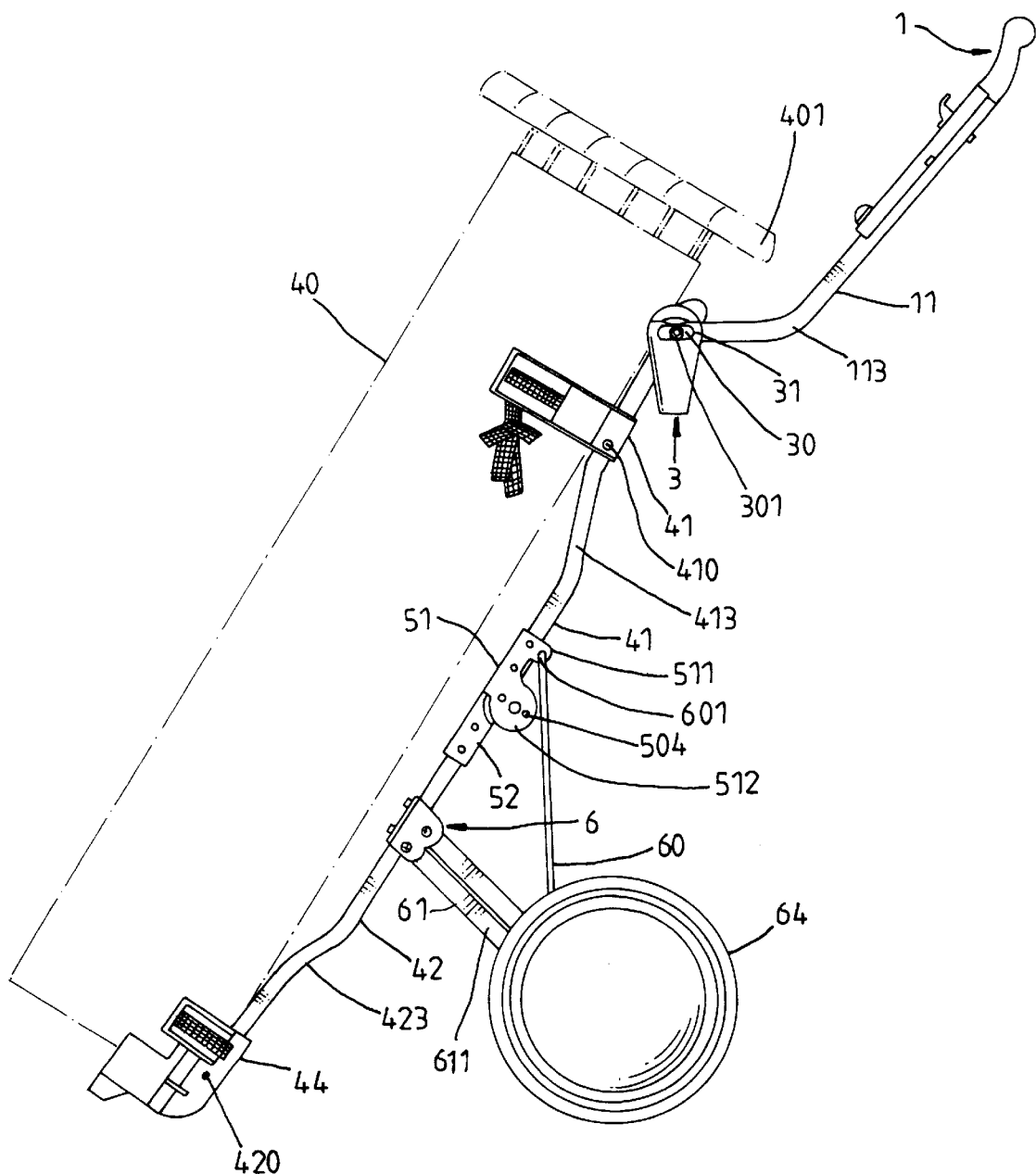
FIG. 16 is a side view of the present invention, showing a golf bag carried on the upper golf bag cradle and the lower golf bag cradle.

The first mounting frame 51 comprises two lugs 511 disposed at two opposite lateral sides and respectively coupled to one end, namely, the front end 601 of the respective link 60 at each support 61 of the wheel holder frames 61, and two circular coupling plates, namely, the first circular coupling plate 512 and the second circular coupling plate 513 respectively formed integral with two opposite lateral side walls thereof The circular coupling plates 512 and 513 each have a center pivot hole 5121 or 5131. The first circular coupling plate 512 has two locating holes 5122 equally spaced from the center pivot hole 5121 at two opposite sides. The diameter of the pivot hole 5121 of the first circular coupling plate 512 is greater than the pivot hole 5131 of the second circular coupling plate 513. The second mounting frame 52 comprises two substantially circular coupling plates, namely, the first circular coupling plate 522 and the second circular coupling plate 523 respectively formed integral with two opposite lateral side walls thereof corresponding to the circular coupling plates 512 and 513 of the first mounting frame 51. The circular coupling plates 522 and 523 each have a center pivot hole 5221 or 5231. The first circular coupling plate 522 has two locating holes 5222 equally spaced from the center pivot hole 5221 at two opposite sides. The diameter of the pivot hole 5221 of the first circular coupling plate 522 is greater than the pivot hole 5231 of the second circular coupling plate 523. A pivot bolt 53 is mounted in the pivot holes 5121 and 5131 of the circular coupling plates 512 and 513 of the first mounting frame 51 and the pivot holes 5232 and 5231 of the circular coupling plates 522 and 523 of the second mounting frame 52 and fastened up with a stop element 534 to secure the first mounting frame 51 and the second mounting frame 52 together. The pivot bolt 53 comprises a head 533 disposed outside the first mounting frame 51, a shank 531 inserted through the pivot hole 5231 of the second circular coupling plate 523 of the second mounting frame 52 and the pivot hole 5131 of the second circular coupling plate 513 of the first mounting plate 51, and a shoulder 532 connected between the head 533 and the shank 531 and inserted through the pivot hole 5121 of the first circular coupling plate 512 of the first mounting frame 51 and the pivot hole 5221 of the first circular coupling plate 522 of the second mounting frame 52. The stop element 534 is fixedly fastened to the free end of the shank 531 and disposed outside the first mounting frame 51. Further, a locking plate 50 is mounted on the shank 531 of the pivot bolt 53 and moved between the shoulder 532 and the second circular coupling plate 523 of the second mounting frame 52, and a spring 55 is mounted around the shank 531 of the pivot bolt 53 and connected between the locking plate 50 and the second circular coupling plate 523 of the second mounting frame 52. The locking plate 50 comprises a through hole 503, which receives the shank 531, and two locking rods 504 perpendicularly extended from one side thereof and adapted for engaging into the locating holes 5222 of the first circular coupling plate 522 of the second mounting frame 52 and the locating holes 5122 of the first circular coupling plate 512 of the first mounting frame 51. The diameter of the through hole 503 is smaller than the diameter of the shoulder 532 of the pivot bolt 53 but greater than the diameter of the shank 531. Normally, the locking plate 50 is forced by the spring 55 against the shoulder 532 of the pivot bolt 53, keeping the locking rods 504 engaged into the locating holes 5222 of the first circular coupling plate 522 of the second mounting frame 52 and the locating holes 5122 of the first circular coupling plate 512 of the first mounting frame 51, and therefore the front main shaft 41 and the rear main shaft 42 are locked in the operative position (longitudinally aligned position). When pressing the head 533 to move the pivot bolt 53, the locking plate 50 is forced backwards by the shoulder 532 of the pivot bolt 53 to compress the spring 55 and to disengage the locking rods 504 from the locating holes 5222 of the first circular coupling plate 522 of the second mounting frame 52 and the locating holes 5122 of the first circular coupling plate 512 of the first mounting frame 51 (see FIGS. 12 and 13), and therefore the front main shaft 41 and the rear main shaft 42 are unlocked, and allowed to be turned relative to each other between the operative position and the collapsed position.

Figure 1:
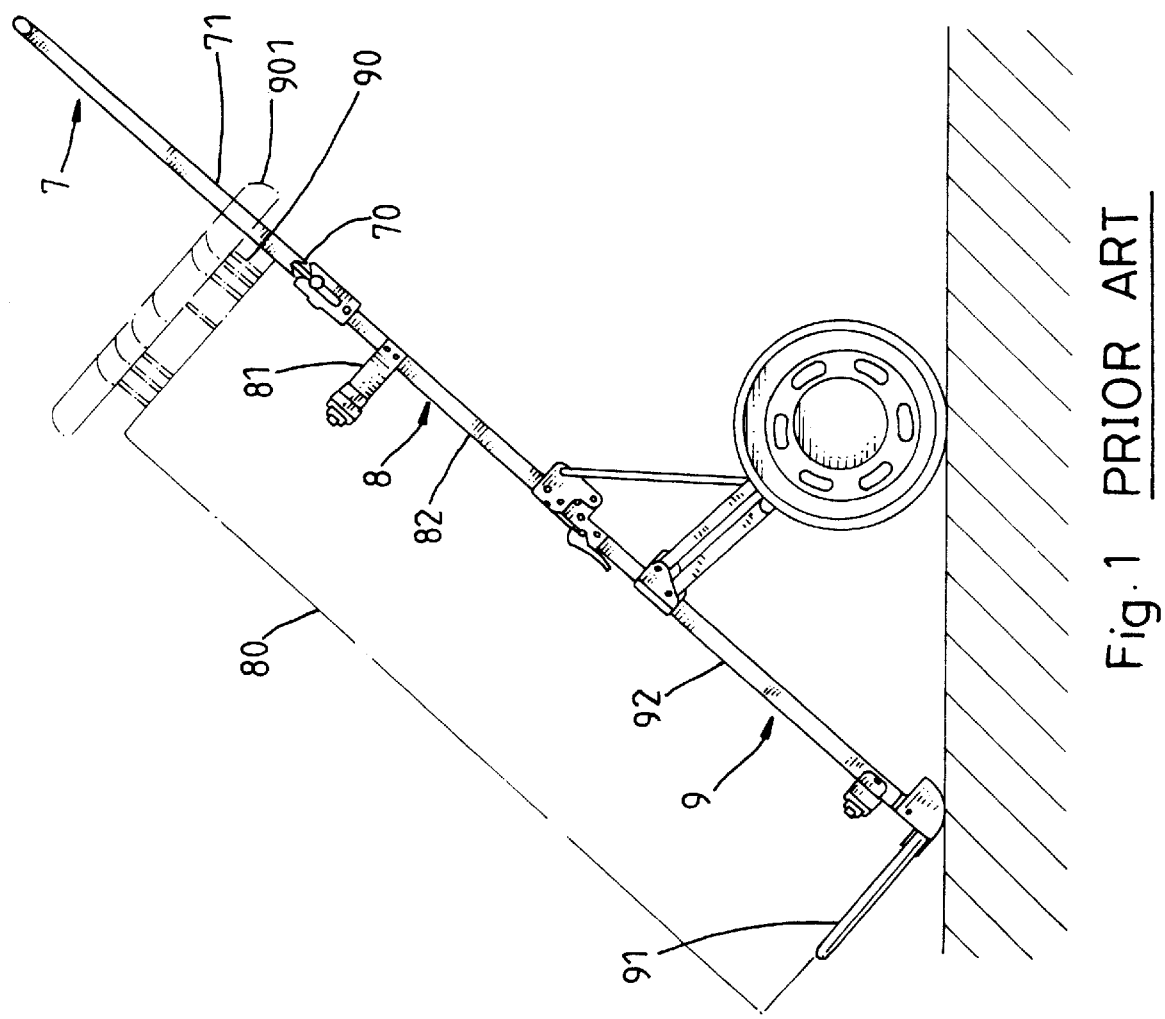
FIG. 1 is a side view of a folding collapsible golf cart according to U.S. Pat. No. RE33,939.
Figure 4:
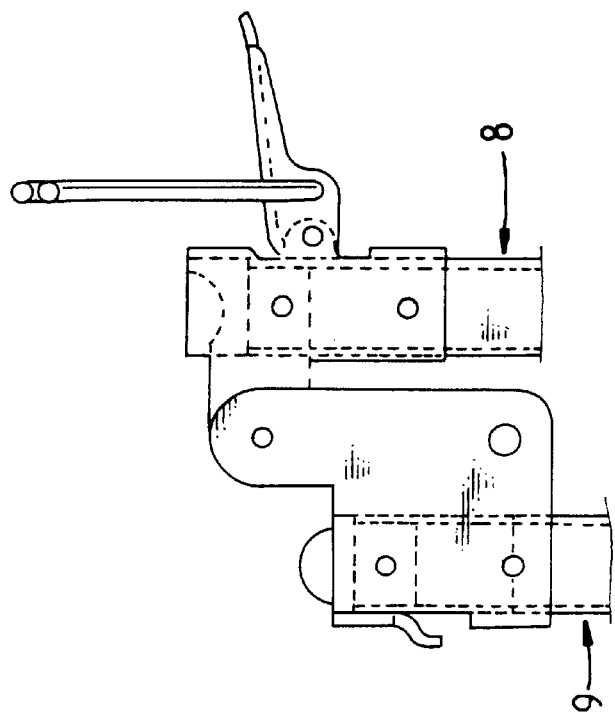
FIG. 4 shows the assembly of FIG. 2 collapsed.
Figure 3:
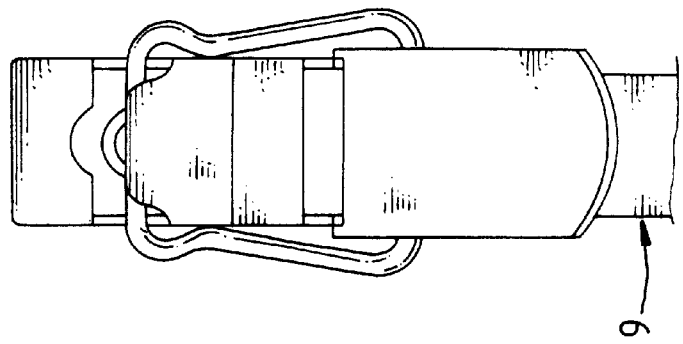
FIG. 3 is a bottom view of FIG. 2.
Figure 2:
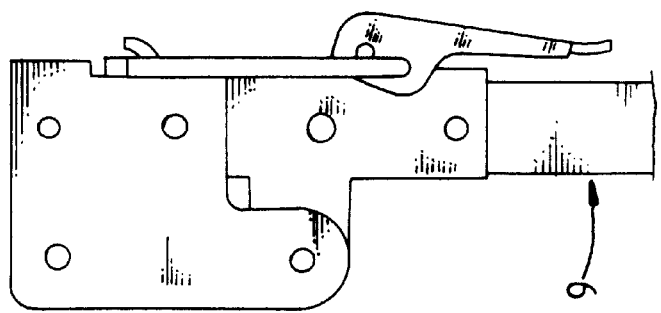
FIG. 2 s a side view of a part of the folding collapsible golf cart shown in FIG. 1.
Figure 5:
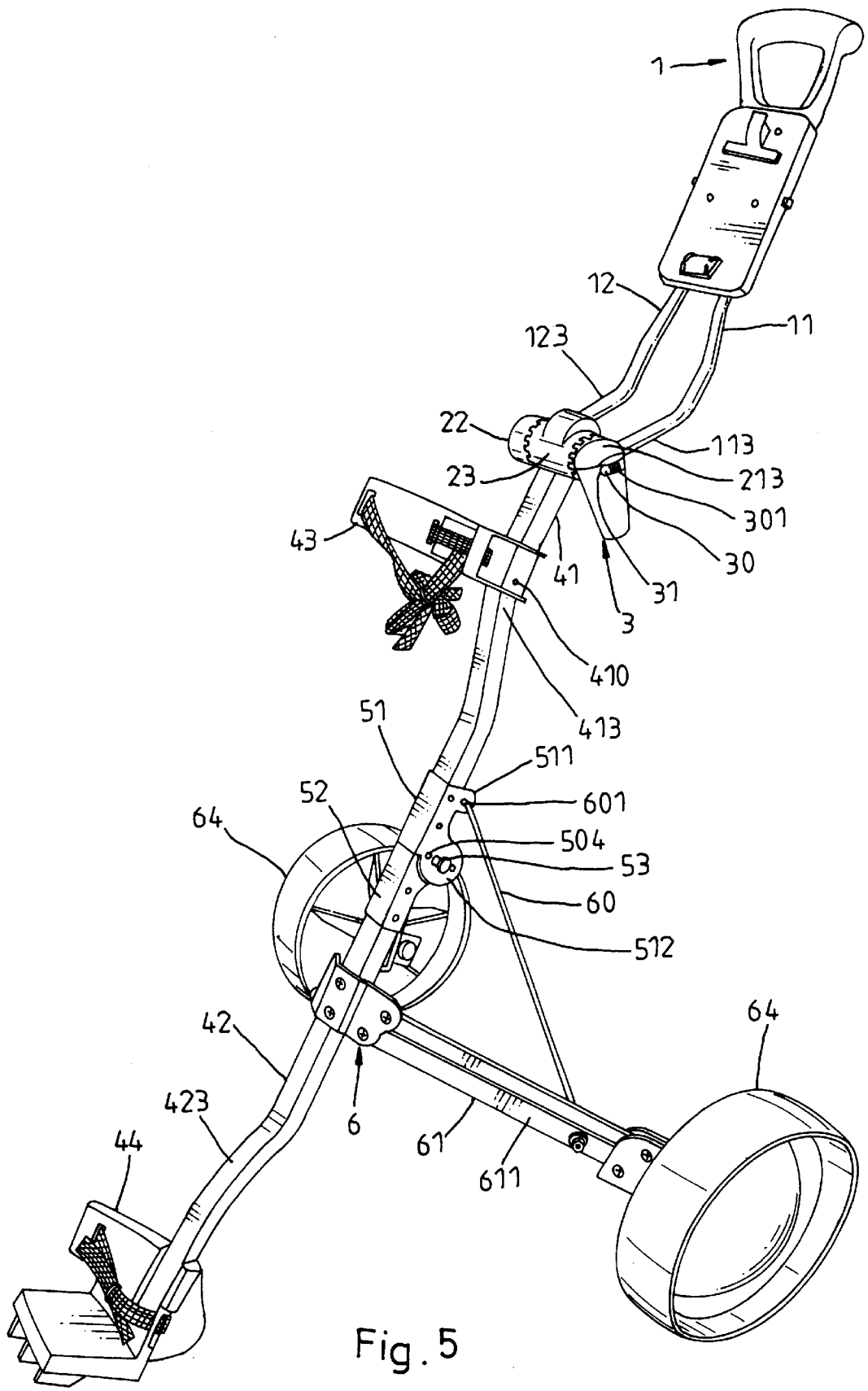
FIG. 5 is a perspective view of a folding collapsible golf cart according to the present invention.
Figure 6:
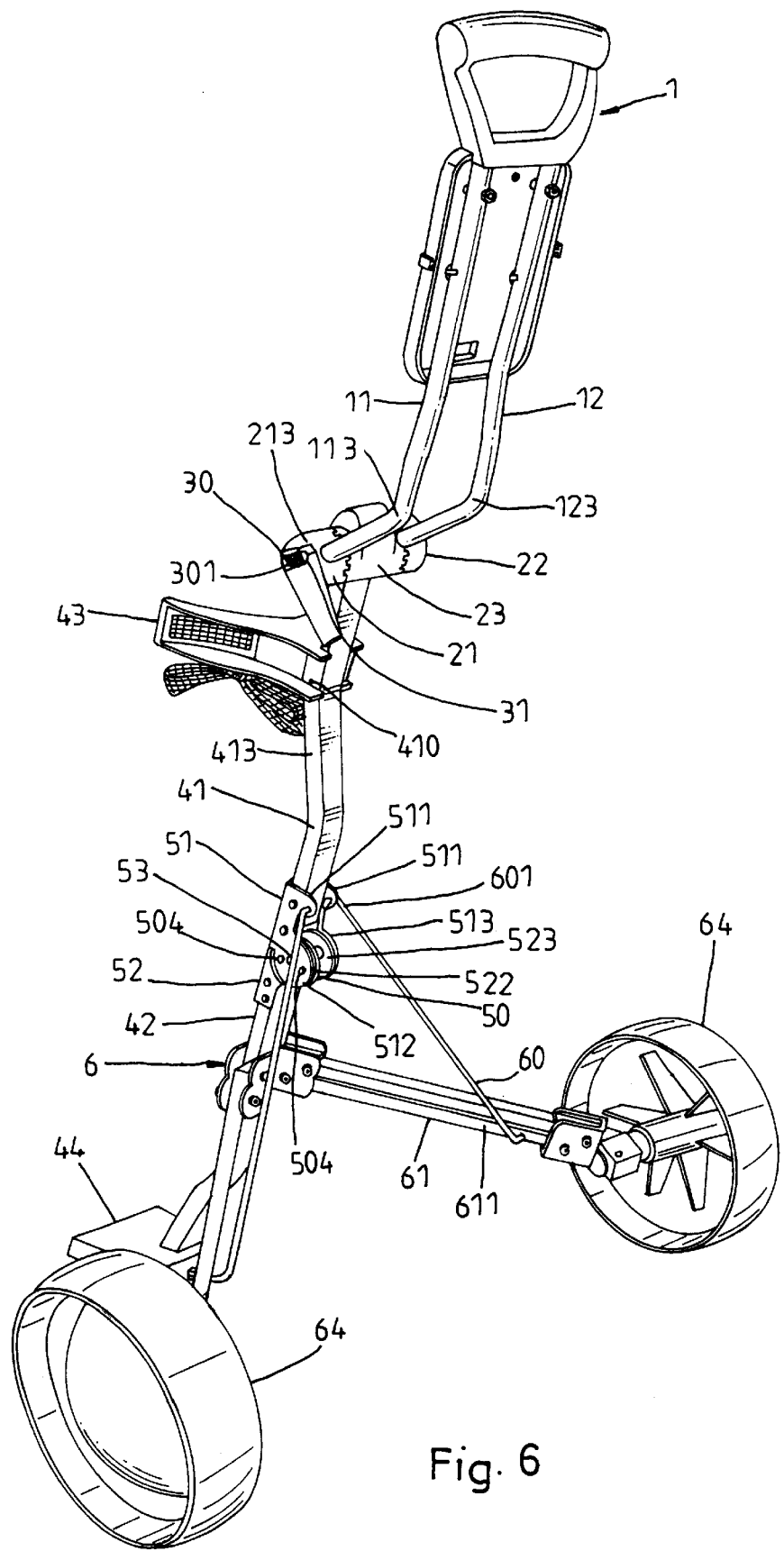
FIG. 6 is an oblique rear side view of FIG. 5.
Figure 7:
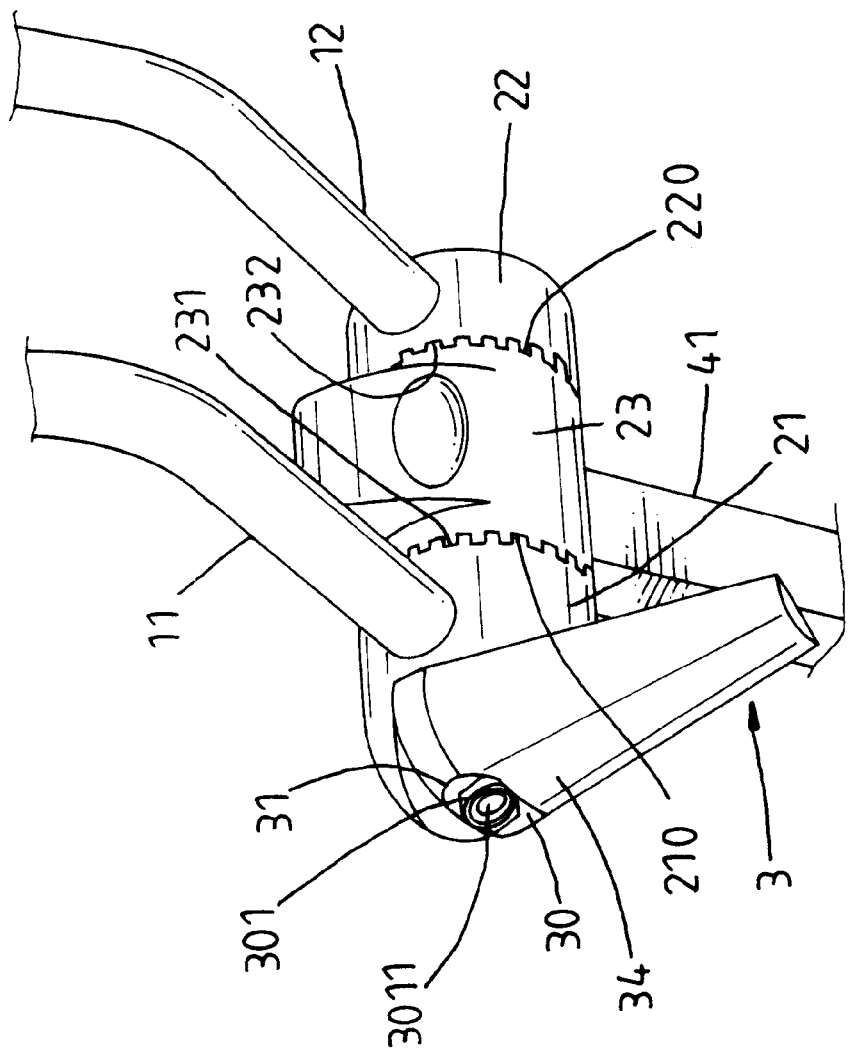
FIG. 7 is an enlarged view of a part of FIG. 6, showing the locking lever set in the locking position.
Figure 17:
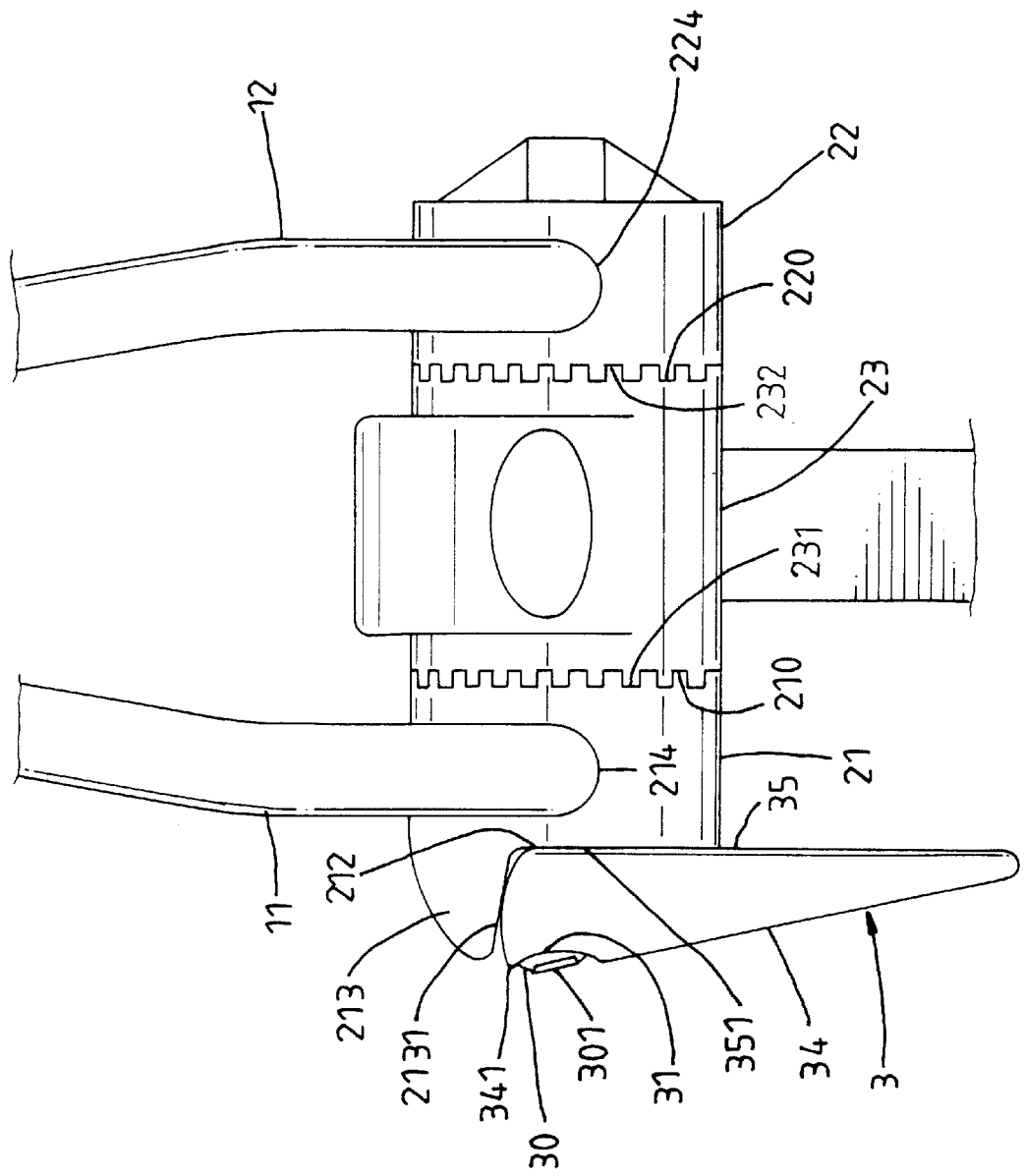
FIG. 17 is a bottom view in an enlarged scale of a part of the present invention, showing the locating block meshed between the first engagement block and the second engagement block, the locking lever set in the locking position.
Figure 18:
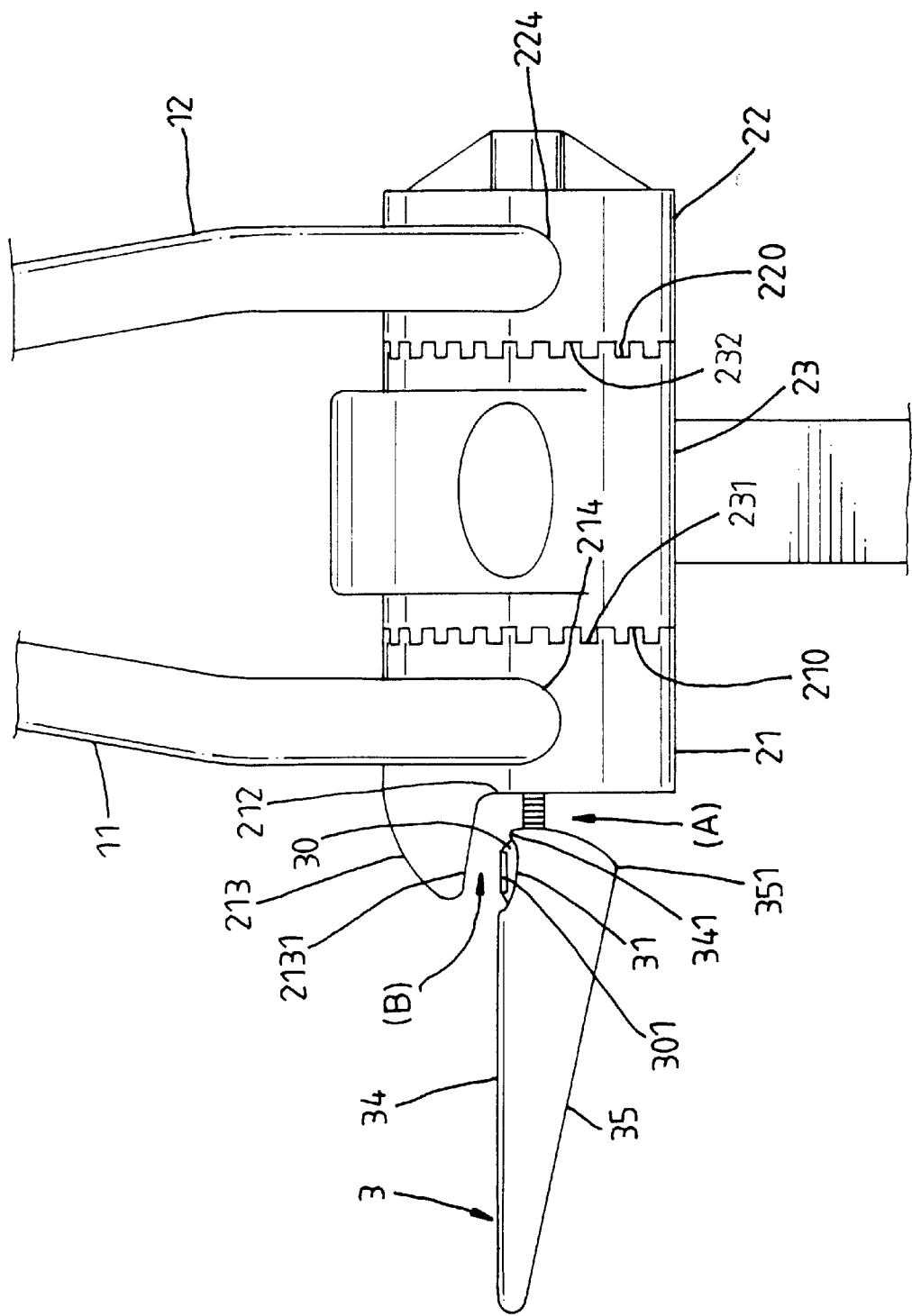
FIG. 18 is similar to FIG. 17 but showing the locking lever turned to the unlocking position.
Figure 19:
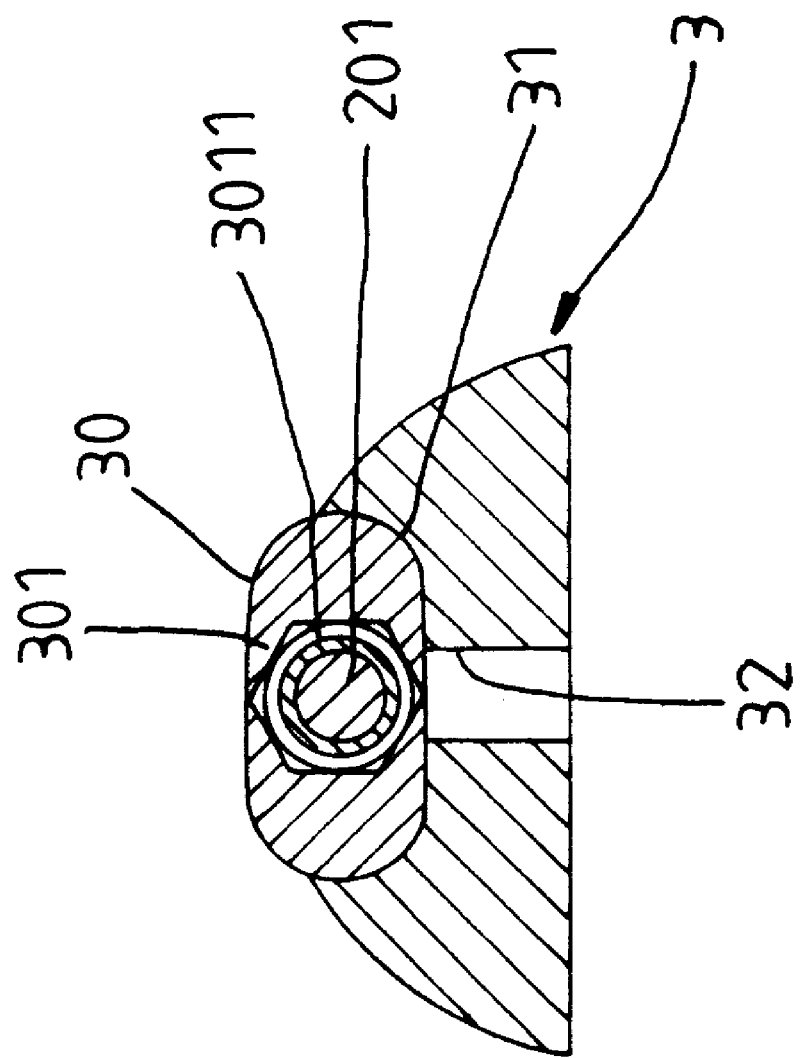
FIG. 19 is a sectional view in an enlarged scale of a part of FIG. 18, showing the positioning plate installed in the locking lever.
Figure 20:
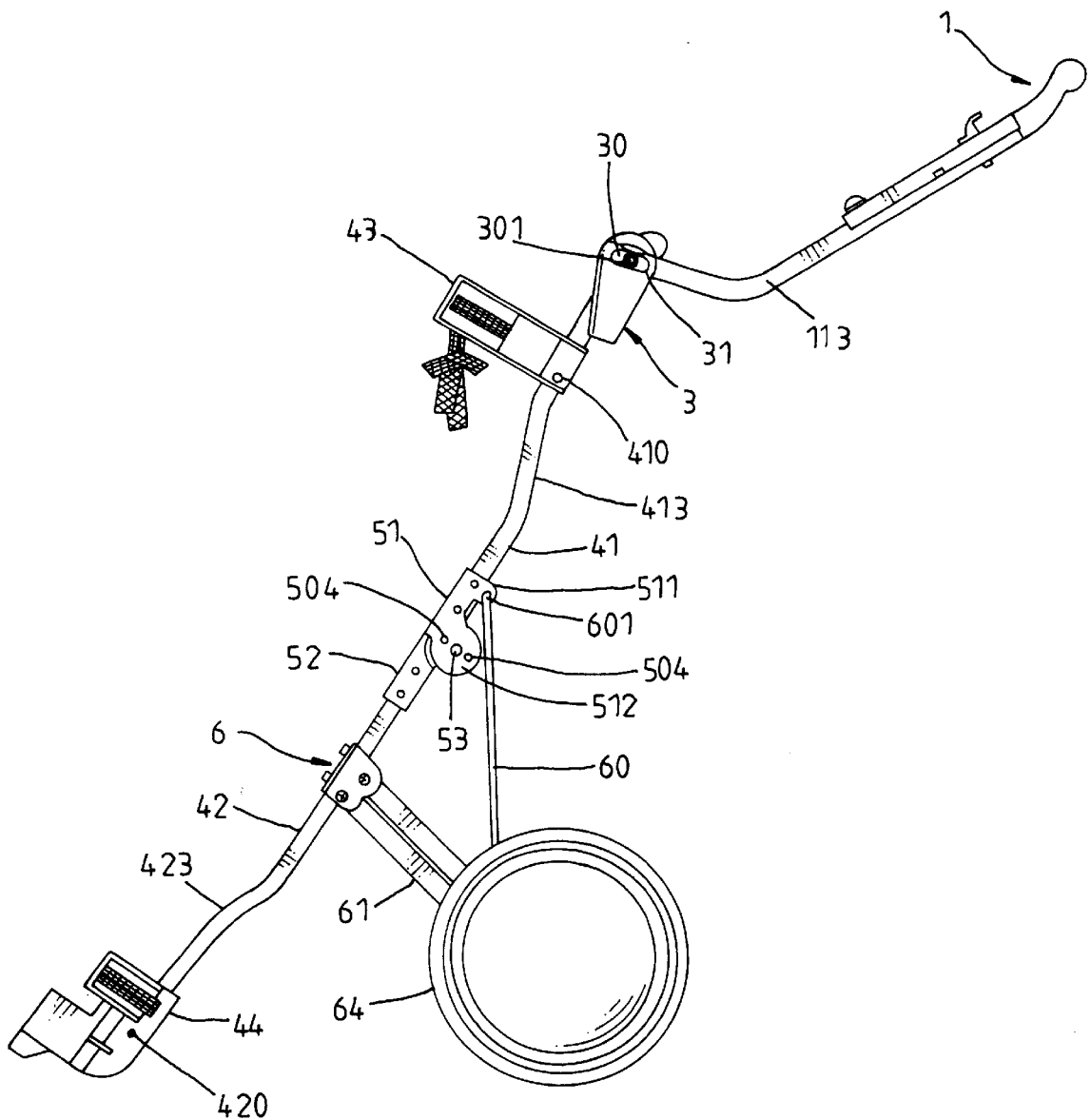
FIG. 20 is another side view of the present invention, showing the angular position of the handle adjusted.

When adjusting the angular position of the handle 1, the locking lever 3 is turned from the locking position shown in FIG. 17 to the unlocking position shown in FIG. 18 to move the stop portion 321 to the threaded rear end 201 of the pivot bolt 20, so that gaps A and B are respectively left between the top side 33 of the locking lever 3 and the flat outer end 212 of the first engagement block 21 and between the upper part 341 of the outer side 34 of the locking lever 3 and the and bottom side 2131 of the protruded portion 213 of the first engagement block 21 for enabling the first engagement block 21 and the second engagement block 22 to be disengaged from the locating block 23, and therefore the handle 1 is allowed to be turned relative to the locating block 23 and the front main shaft 41 to the desired angle. After adjustment, the locking lever 3 is turned back from the unlocking position to the locking position to force the first engagement block 21 and the second engagement block 22 into engagement with the locating block 23 again (see FIGS. 7 and 17).

Figure 21:
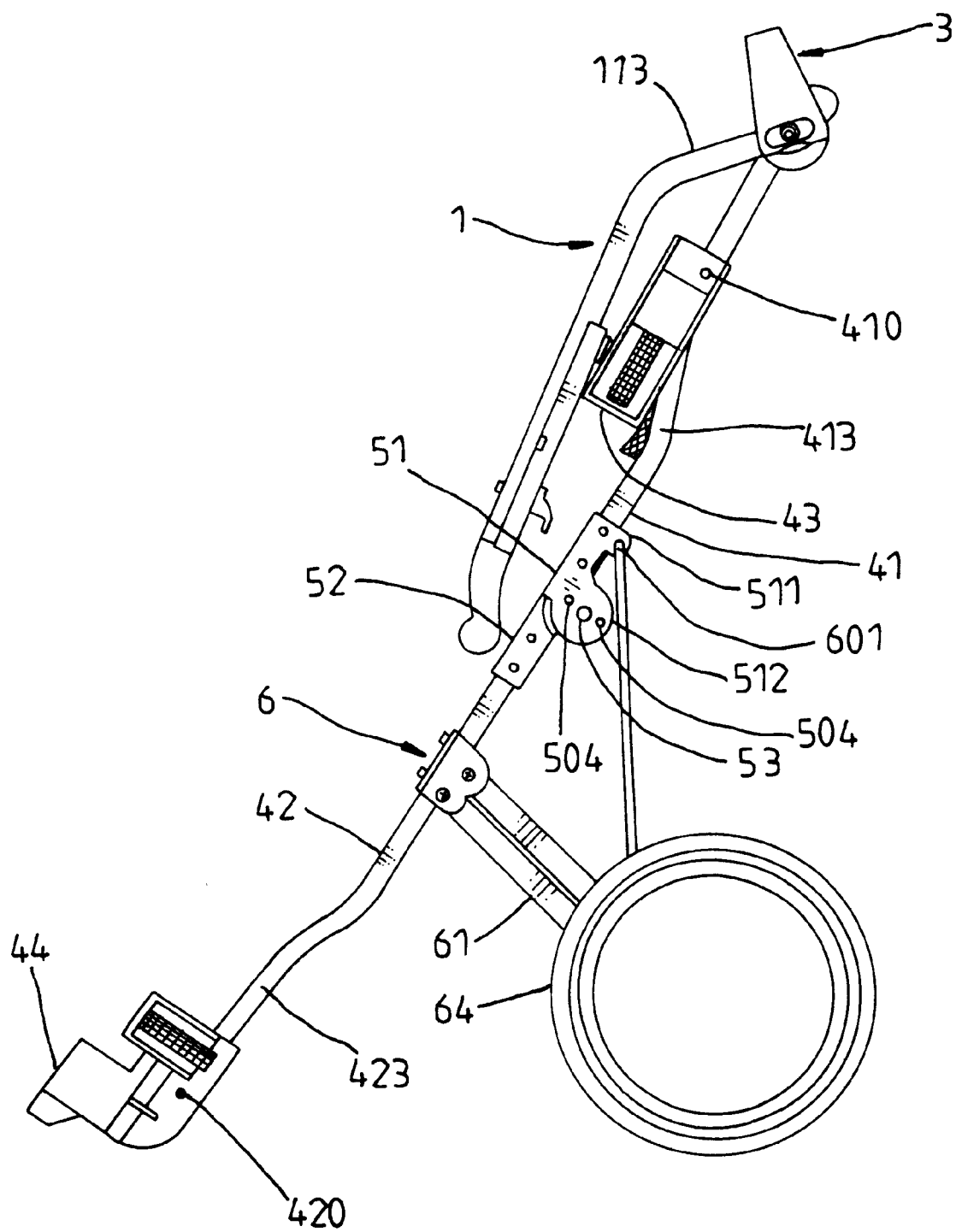
FIG. 21 is another side view of the present invention, showing the upper golf bag cradle and the handle collapsed.
Figure 22:
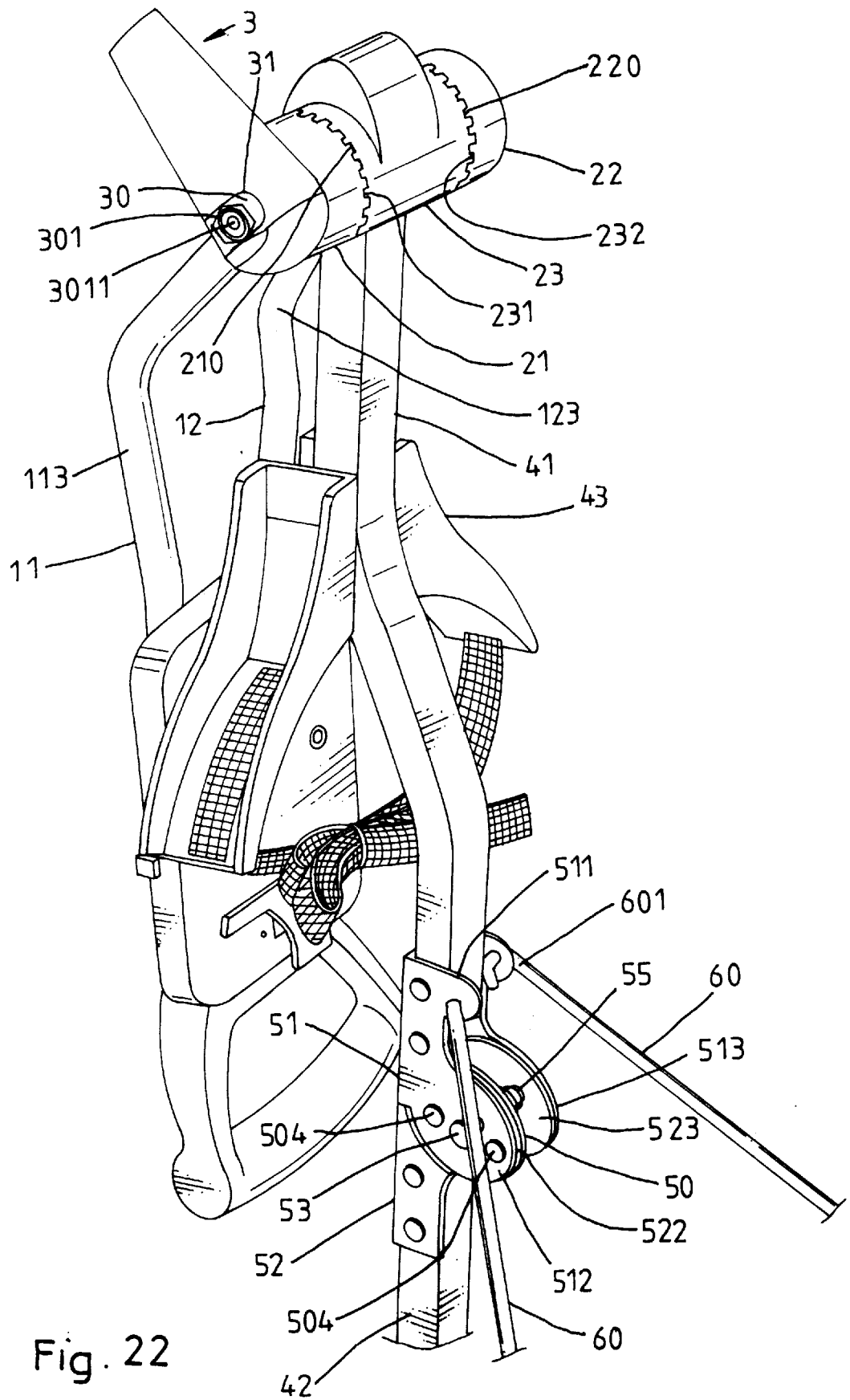
FIG. 22 is a perspective view in an enlarged scale of a part of FIG. 21 when viewed from another angle.
Figure 23:
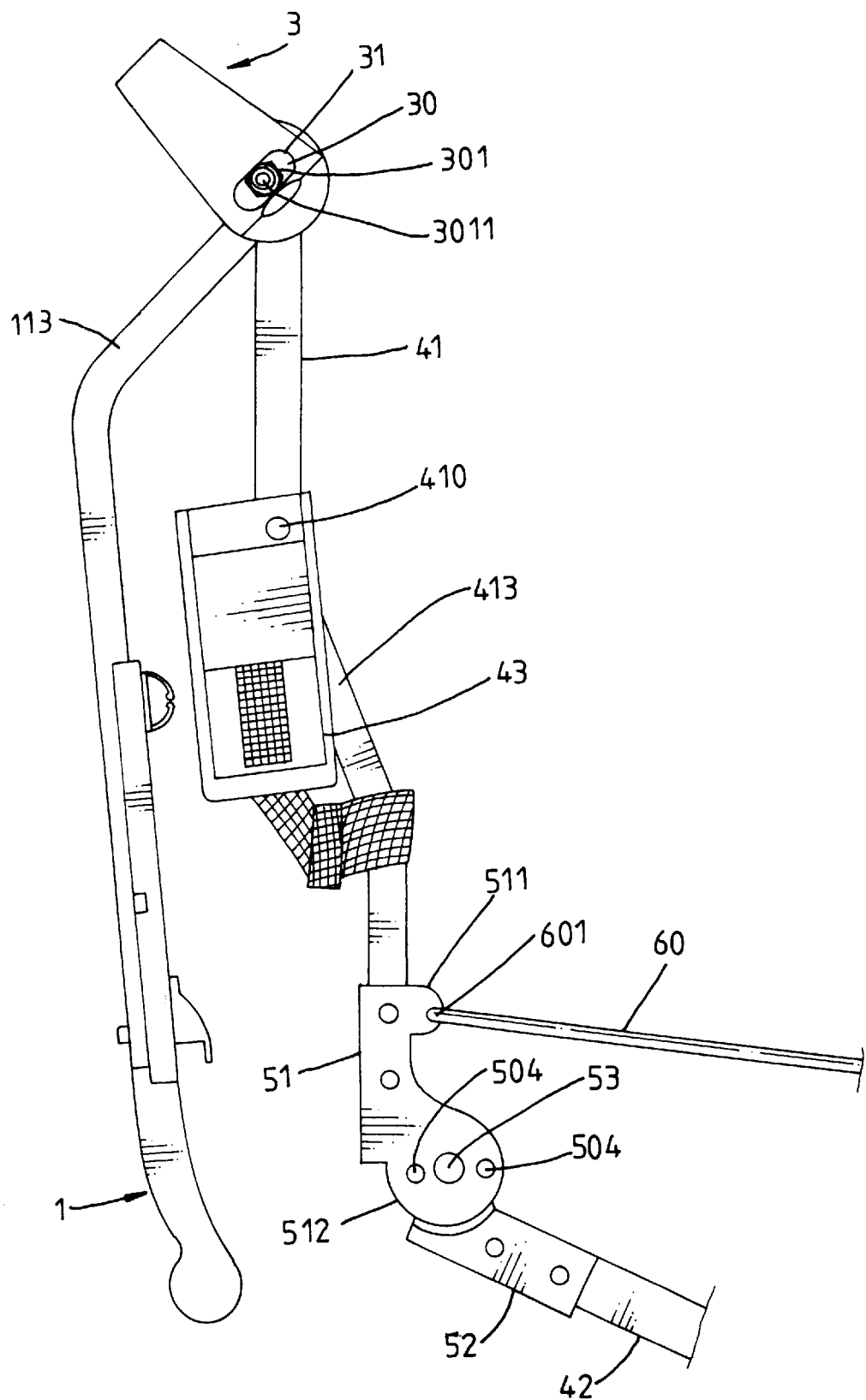
FIG. 23 is a side view in an enlarged scale of a part of the present invention, showing the handle and the upper golf bag cradle collapsed, the front main shaft turned relative to the rear main shaft.
Figure 24:
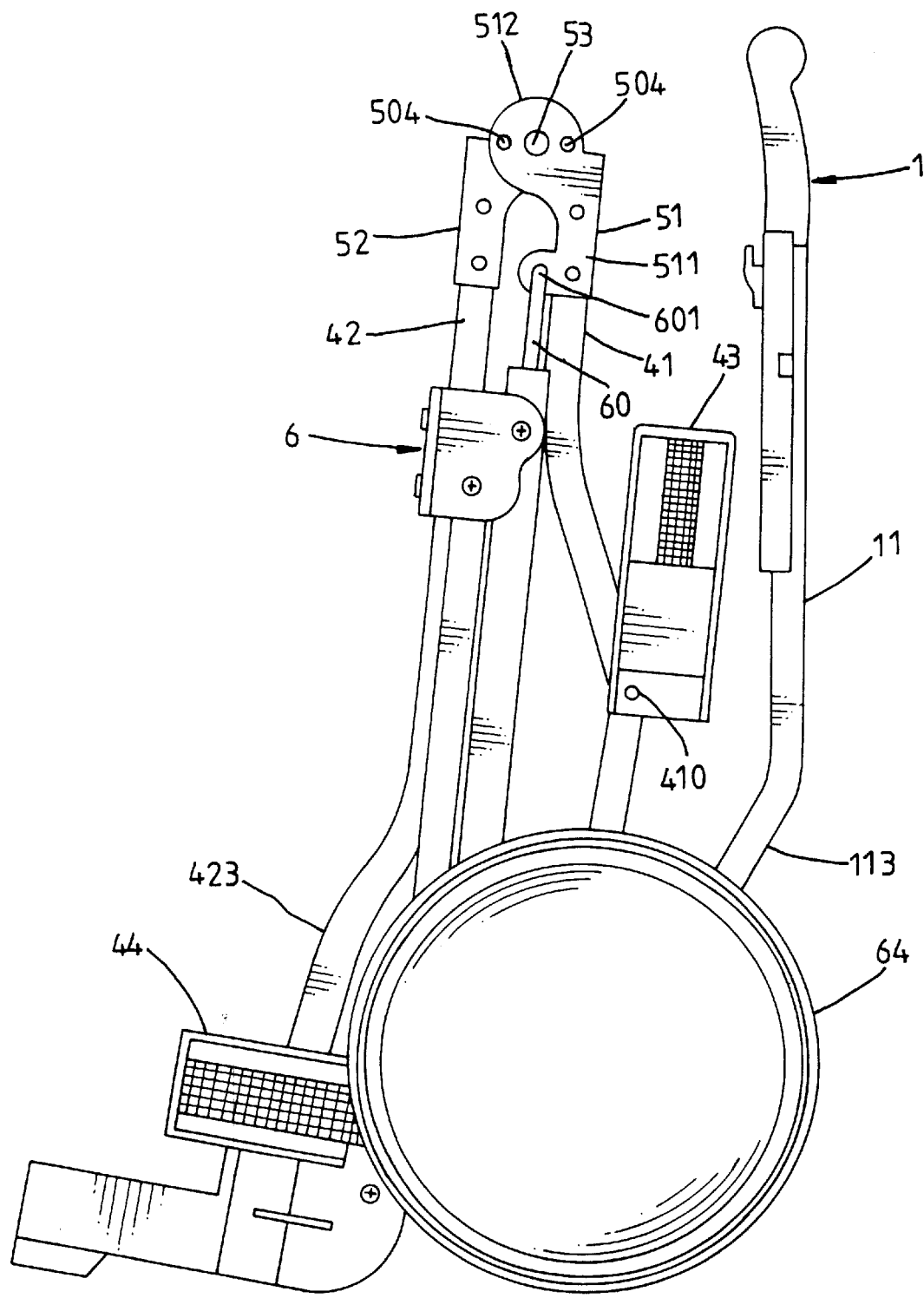
FIG. 24 is a side view in an enlarged scale of the present invention, showing the folding collapsible golf cart collapsed.
Figure 25:
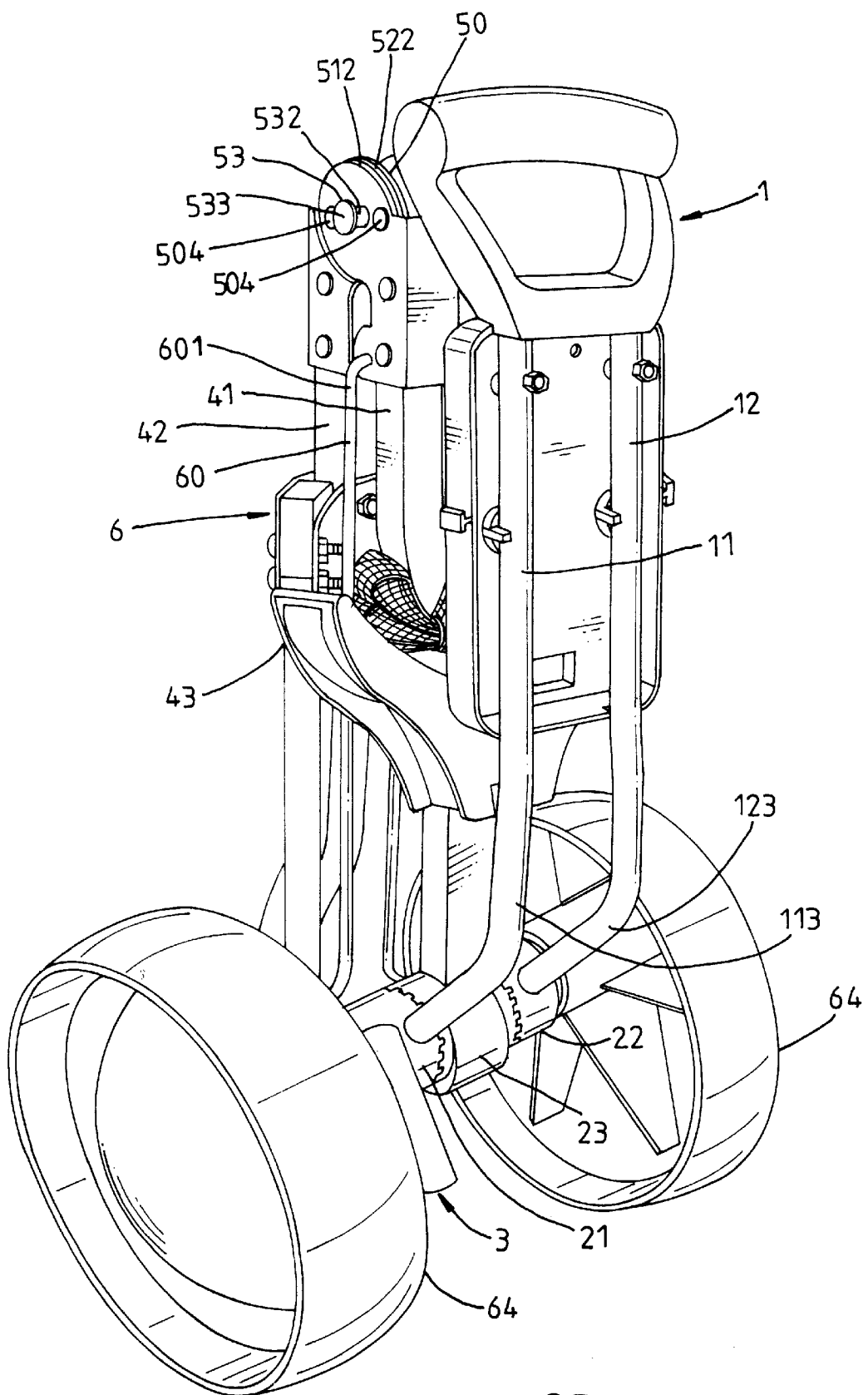
FIG. 25 is a perspective view in an enlarged scale of the present invention, showing the folding collapsible golf cart collapsed.

Referring to FIGS. from 21 through 25, when not in use, the upper golf bag cradle 43 is turned downwards and closely attached to the front main shaft 41, and then the locking lever 3 is turned from the locking position to the unlocking position, and then the handle 1 is turned to the collapsed position and closely attached to the collapsed upper golf bag cradle 43 (see FIGS. 21 and 22), and then the pivot bolt 53 is pressed to disengage the locking plate 50 from the locating holes 5222 of the first circular coupling plate 522 of the second mounting frame 52 and the locating holes 5122 of the first circular coupling plate 512 of the first mounting frame 51 (see FIGS. 12 and 13), and then the front main shaft 41 is turned with the handle 1 and closely attached to the rear main shaft 42 (see FIG. 23), causing the wheel holder frames 61 and the wheels 64 to be moved with the link 60 to the collapsed front main shaft 41 and rear main shaft 42 (see FIGS. 24 and 25). When repeating the aforesaid procedure in the reversed direction, the golf cart is extended out and set in the operative position.

Further, the front main shaft 41 has a curved portion 413 curved forwardly upwards toward the upper golf bag cradle 43, the rear main shaft 42 has a curved portion 423 curved backwardly upwards toward the lower golf bag cradle 44, and the rod members 11 and 12 of the handle I have a respective curved portion 113 curved backwardly upwards. When a golf bag 40 is fastened to the upper golf bag cradle 43 and the lower golf bag cradle 44, a big space is left between the golf bag 40 and the handle 1, preventing the rod members 11 and 12 of the handle 1 from touching the heads 401 of the golf clubs kept in the golf bag 40.

What is claimed is:

1. A folding collapsible golf cart comprising:
   a front main shaft said front main shaft having a front end and a rear end;
   a first mounting frame fixedly mounted on the rear end of said front main shaft;
   an upper golf bag cradle pivoted to said front main shaft;
   a handle coupled to the front end of said front main shaft and turned relative to said front main shaft within a limited angle between an extended position and a collapsed position;
   a pivot bolt, which couples said handle to said front main shaft for enabling said handle to be turned relative to said front main shaft within a limited angle between an extended position and a collapsed position;
   a positioning plate fastened to said pivot bolt,
   a locking lever pivoted to said pivot bolt and adapted to lock/unlock said handle;
   a rear main shaft, said rear main shaft having a front end and a rear end;
   a second mounting frame fixedly mounted on the front end of said rear main shaft and pivoted to said first mounting frame;
   a lower golf bag cradle pivoted to said rear main shaft;
   a wheel bracket fixedly mounted on said rear main shaft on the middle between said second mounting frame and said lower golf bag cradle;
   two wheel holder frames respectively pivoted to said wheel bracket and holding a respective wheel; and
   two links bilaterally coupled between said wheel holder frames and said first mounting frame;
   wherein said handle comprises a first rod member, a second rod member, a first engagement block, and a second engagement block, said first rod member and said second rod member being arranged in parallel each having an axle hole transversely extended at a distal end, said first engagement block and said second engagement block being injection-molded from plastics and respectively mounted on said first rod member and said second rod member, each comprising a toothed face disposed at one side, an axle hole axially extended through the center of said toothed face ice, and a transversely extended coupling hole, which receives the corresponding rod member, said first engagement block further comprising a protruded portion axially extended from the border area of a flat outer end thereof; said front main shaft comprises a locating block fixedly mounted on the front end thereof and adapted to be meshed between said first engagement block and said second engagement block, said locating block being injection-molded from plastics, comprising two toothed faces disposed at two distal ends thereof and adapted for engaging the toothed faces of said first engagement block and said second engagement block, and an axle hole axially extended through the center of the toothed faces thereof, said pivot bolt is inserted through the axle hole of said second rod member, the axle hole of said second engagement block, the axle hole of said locating block, the axle hole of said first rod member and the axle hole of said first engagement block, having a threaded rear end; said locking lever comprising a recessed positioning portion, which receives said positioning plate, an axle groove backwardly extended from said recessed positioning portion for the passing of said pivot bolt, and a stop portion disposed at one end of said axle groove; said positioning plate comprises an embedded metal block, said metal block comprising a screw hole threaded onto the threaded rear end of said pivot bolt to secure said locking lever to said pivot bolt, enabling said locking lever to be turned between the locking position where the toothed face of said engagement block and the toothed face of second engagement block are respectively forced into engagement with the toothed faces of said locating block to stop said handle from movement relative to said front main shaft and the unlocking position where the toothed face of said first engagement block and the toothed face of said second engagement block are respectively disengaged from the toothed faces of said locating block for enabling said handle to be turned relative to said front main shaft between said extended position and said collapsed position.

2. The folding collapsible golf cart of claim 1 wherein said front main shaft has a curved portion curved forwardly upwards toward said upper golf bag cradle, said rear main shaft has a curved portion curved backwardly upwards toward said lower golf bag cradle, and the rod members of said handle have a respective curved portion curved backwardly upwards, such that a big space is left between the golf bag and said handle after the mounting of the golf bag on said upper golf bag cradle and said lower golf bag cradle, preventing the rod members of said handle from touching the heads of the golf clubs kept in the golf bag.

* * * * *